Nov. 30, 1954  O. VON ZELEWSKY  2,695,543
MULTIPLE-CUT ATTACHMENT FOR LATHES
Filed Sept. 12, 1950  4 Sheets-Sheet 1

INVENTOR:
Ottomar von Zelewsky
BY
Richards Geier
ATTORNEYS

INVENTOR:
Ottomar von Zelewsky
BY
Richard y Geier
ATTORNEYS

INVENTOR:
Ottomar von Zelewsky

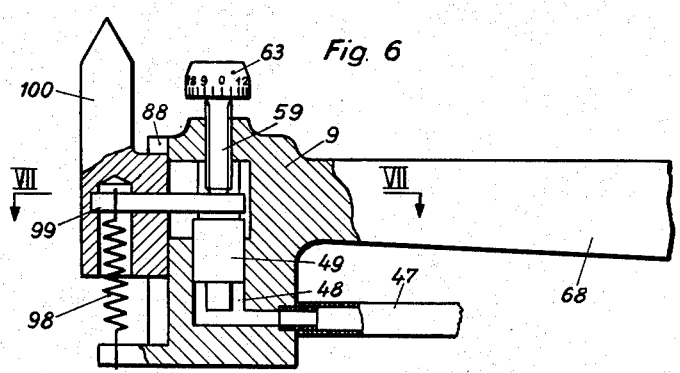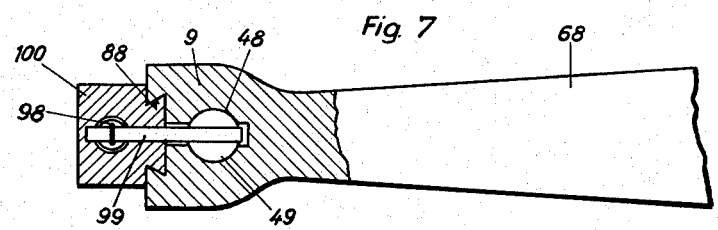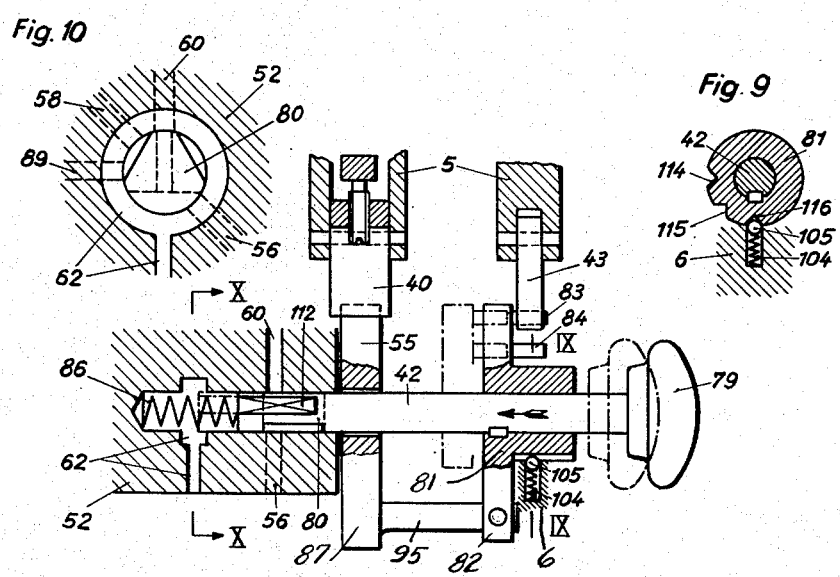

United States Patent Office 2,695,543
Patented Nov. 30, 1954

2,695,543

MULTIPLE-CUT ATTACHMENT FOR LATHES

Ottomar von Zelewsky, Neuhausen am Rheinfall, Switzerland, assignor to Georg Fischer Aktiengesellschaft, Schaffhausen, Switzerland, a company of Switzerland Application September 12, 1950, Serial No. 184,453

11 Claims. (Cl. 82—14)

The present invention relates to a multiple-cut attachment for lathes with a hydraulic copying attachment in which a stylo or tracer point in conjunction with a control piston, scanning a pattern attached to the machine frame, regulates the in-feed of a tool slide displaceable transversely to the direction of travel of a saddle, a sequence of several successive turning operations being effected. The present application is a continuation-in-part of my co-pending patent application Serial Number 184,451, filed September 12, 1950.

It has proved advantageous, when using lathes equipped with hydraulic copying attachments, to machine workpieces in a plurality of successive turning operations, as for example in a first rough-turning operation, a second rough-turning operation and a finish-turning operation. It was expedient for this purpose to carry out the entire machining cycle on an automatic basis.

According to the present invention the control and locking members which must be brought by hand into operating position for the purpose of initiating the first turning operation are successively operated by tripping members in order to control turning operations, at least two patterns being used in combination and a change in the distance between the lathe tool and the point of contact of the tracer point or style with a pattern being effected.

The annexed drawing illustrates an embodiment of the invention for a machining sequence of three cuts in automatic succession, in which drawing:

Fig. 6 is a longitudinal section through the adjustable stylo or tracer point;

Fig. 7 is a section through the adjustable stylo or tracer point, along the line VII—VII in Fig. 6;

Fig. 8 is a schematic representation of the arrangement of the control members;

Fig. 9 is a section along the line IX—IX in Fig. 8;

Fig. 10 is a section along the line X—X in Fig. 8.

Figure 1:
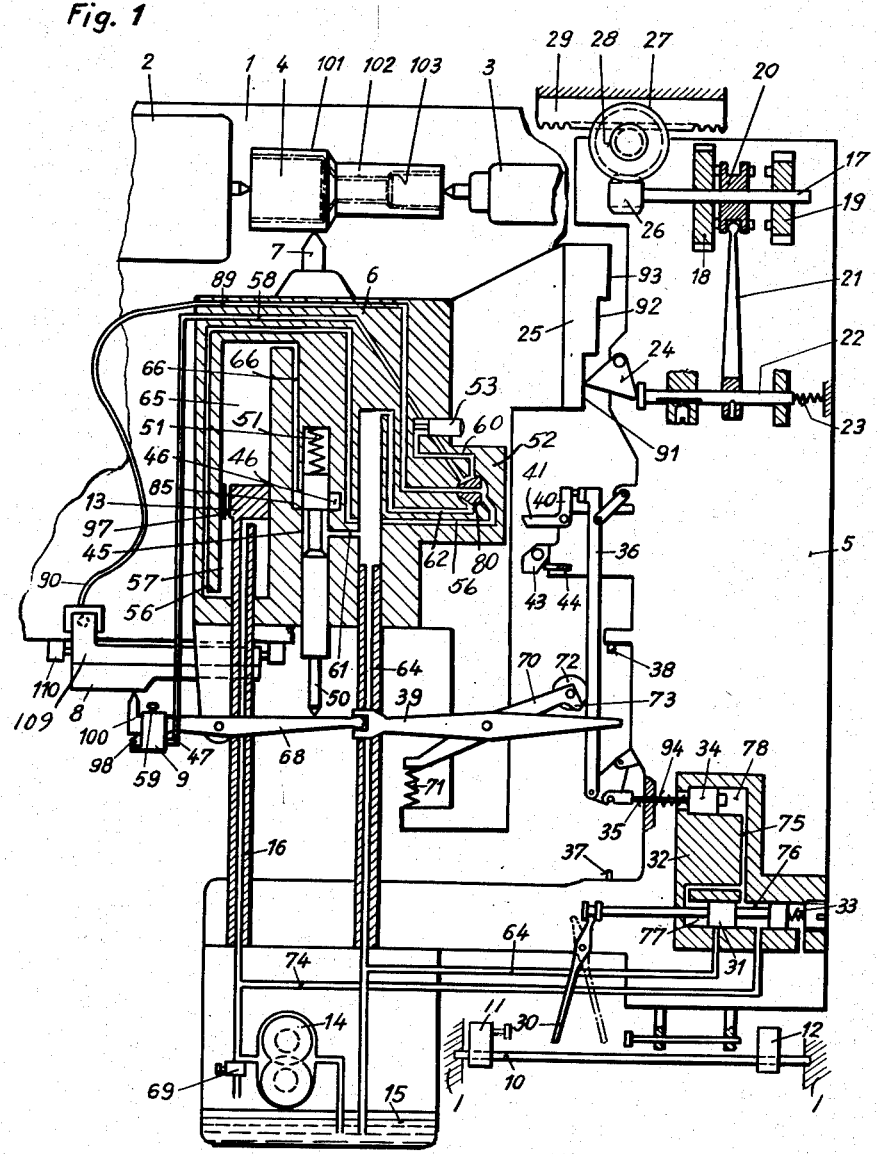
Fig. 1 is a schematic representation of a hydraulic copying attachment showing the control, locking and tripping members.

Fig. 1 shows fragmentarily-represented parts of a lathe bed 1 with a headstock 2 and a tailstock 3. By means not shown in the drawing a workpiece 4 chucked between said headstock 2 and said tailstock 3 is set in rotary motion from the headstock 2. A saddle 5 is slidable on the lathe bed 1, on slides or ways not shown, in a direction parallel to the axis of rotation of said workpiece 4. A tool slide 6 with a lathe tool 7 slides, on a differential piston 13 rigidly connected to the saddle 5 and on guideways not shown in the drawing, perpendicularly to the direction of travel of the saddle 5. The tool slide 6 could also, however, be arranged to slide at an angle to the direction of travel of the saddle 5. Secured to the lathe bed 1 is a trip shaft 10 on which one left-hand and one right-hand stop or trip block, 11 and 12 respectively, are so arranged as to be longitudinally slidable thereon. Located at the bottom of the saddle 5, in the tank 15 containing the hydraulic pressure medium, is a pump 14 driven by means not shown, and a pressure pipe 16 leads to the differential piston 13. For the purpose of maintaining a constant pressure in the pressure pipes 16 and 74 a relieving valve 69 is provided. In a port 97 of the differential piston 13 is a pressure-reducing valve not shown, through which hydraulic pressure medium under variable pressure can pass from the chamber 57 at constant pressure into the chamber 65. Mounted in the saddle 5 is a feed gear represented schematically only and consisting of the worm shaft 17, the two gearwheels 18 and 19, and the coupling member 20, which latter can be operated by a rod 21 and an operating shaft 22. By means of a spring 23 the operating shaft 22 is pressed against a pawl 24, which is able to slide on a slide rail 25 fixed to the tool slide 6 and bearing adjustable trip blocks 91, 92 and 93. The worm 26 engages with a wormwheel 27 connected to a pinion 28 engaging with a toothed rack 29. The rack 29 is secured to the lathe bed 1 and the two gearwheels 18 and 19 controlling a feeding and a return motion of the saddle 5 on the lathe bed 1 are driven by means not shown through suitable gearing.

Also pivotally secured to the saddle 5 is a resetting lever 30 which operates a distributing piston 31 in a control block 32, in which a spring 33 tends to force the distributing piston 31 to the left (Fig. 1). A piston 34 is connected by a rod 35 and a compression spring 94 to a slide bar 36 articulated to the saddle 5 and adjustable parallelly to itself. Two stops 37 and 38 are fitted to the saddle 5 for the auxiliary scanning lever 39, which is pivotally mounted on the tool slide 6. Said two stops 37 and 38 become operative only when the tool slide 6 reaches its top or bottom position in relation to the saddle 5. A bell-crank lever 40 mounted on the saddle 5 is able to act on the slide bar 36 when the intercepting cam 55 of the cam lever 87 bears against the face 41 of the bell-crank lever 40 from below. In addition, a pawl 43 secured to the saddle 5, acting as a tripping member and swivelling in a downward direction only, is retained by a spring 44 in the position shown in the drawing.

Sliding in a bore 45 in the tool slide 6 is a control piston or plunger 50 which is forced downward against the scanning arm 68 by a spring 51 braced in the tool slide 6. From the chamber 65 above the differential piston 13 a duct 66 leads into an annular chamber 46 of the control piston 50, and from the bore 45 of the control piston or plunger 50 a duct 61 leads into the return pipe 64. From the distributing slide valve 52 a duct 58 and a mobile communicating member, for instance a flexible pipe 47, lead into a bore 48 with an adjustable piston 49 of the head 9 in the scanning arm 68 (Fig. 6). Located in the head 9, opposite the end face of the adjustable piston 49, is a set screw 59 with a scale 63 on which the amount of adjustment, in relation to the head 9, of the adjustable stylo of tracer point 100, which slides in a dovetailed guide 88, can be set. The adjustable tracer point 100 is drawn downwards by a tension spring 98 and a pin 99 (Fig. 6), the adjustable piston 49 resting at the bottom of the bore 48 when no hydraulic pressure is operating. If it is the intention to work with the adjustable stylo 100 not displaced in relation to the head 9, the set screw 59 is fully tightened until it bears on the adjustable piston 49, i. e., on the pin 99.

Pivotally mounted on the tool slide 6 is a scanning arm 68 engaging with the auxiliary scanning lever 39, at the head 9 of which scanning arm 68 an adjustable stylo or tracer point 100 is able to scan patterns 8 or 108 arranged on the lathe bed 1. An auxiliary lever 70 is pivotally mounted in the tool slide 6 and a spring 71 tends to pivot said auxiliary lever 70 in a clockwise direction; a roller 72 travels along the slide bar 36 and a lug 73 bears on the auxiliary scanning lever 39 when the auxiliary lever 70 is pivoted in a clockwise direction. A pressure pipe 74 leads from the pressure pipe 16 to the control block 32 and a duct 75 from the annular chamber 76 into the chambers 77 and 78.

The control members consist of a shaft 42, mounted in the tool slide 6, with a handwheel 79 rigidly secured thereto, a friction plate 80, a distributing slide valve 52 and a lever 81 with a lug 82 and two pins 83 and 84.

The shaft 42 with handwheel 79 and lever 81 is slidable in an axial direction against the pressure of a spring 86 (Fig. 8). The shaft 42 can be arrested in three control positions by three notches 114, 115 and 116 in the lever 81, a spring 104 located in the tool slide 6 forcing a ball 105 selectively into one or other of said three notches 114, 115 and 116 (Fig. 9). Pivotally mounted on the shaft 42 is a cam lever 87 with an intercepting cam 55 and a blocking surface 54 for the intercepting plunger 53, and an arresting lug 95 which, in one end position, can come into contact with the stop pin 82 of the lever 81 (Fig. 3) and in the other end position with the stop 96 on the tool slide 6 (Fig. 5). From the distributing slide valve 52 a further duct 89 leads to a flexible pipe 90 which in turn leads to a pattern-swivelling device. The latter comprises, as Figs. 2 to 5 show, a housing 106, secured to the lathe bed 1, with a piston 10 which is able to swivel a pattern holder 109 with the patterns 8 and 108 secured therein, against the pressure of a spring 111 braced against the lathe bed 1, as far as the stop 113, said pattern holder 109 being pivotally guided at both ends in bearings 110 secured to the lathe bed 1.

From the distributing slide valve 52 a further duct 60 leads to an intercepting plunger 53 arranged in the tool slide, and a duct 56 leads from the chamber 57 underneath the differential piston 13 to the distributing slide valve 52.

The relieving ducts 112 of the friction plate 80 in the distributing slide valve 52 communicate through a duct 62 (Fig. 10) with the return pipe 64, so that the three ducts 58, 60 and 89 are always without pressure when in the momentary control position they are not in communication with the pressure pipe 56.

It would also be possible, however, to arrange the control and locking members on the saddle and the tripping members on the tool slide. This would involve no change in the functioning of the members or of the multiple-cut attachment.

The manner in which the embodiment of a multiple-cut attachment in combination with a pattern swivelling device and hydraulic continuous-flow control, all as represented in Figs. 1 to 10, operates, is as follows:

A workpiece 4, chucked between the headstock 2 and the tailstock 3 and set in rotation by means not shown in the drawing, is, in a machining sequence of three operations or cuts succeeding each other automatically, to be so machined that when copying the first cut in accordance with pattern 8 the contour 101, when copying the second cut in accordance with pattern 108 the contour 102, and when copying the third cut in accordance with pattern 108 the contour 103 is produced (Figs. 2 to 5).

The sequence of the automatically succeeding operations is as follows:

1. Starting up.
2. Initiation of the machining sequence, swivelling of the pattern holder, and copying of the first cut.
3. Retraction of the tool slide and return travel of the saddle from the first cut.
4. In-feed of the tool slide, swivelling back of the pattern holder, operation of the adjustable tracer point or stylo, and copying of the second cut.
5. Retraction of the tool slide and return travel of the saddle from the second cut.
6. In-feed of the tool slide, retraction of the adjustable stylo, and copying of the third cut.
7. Retraction of the tool slide and return travel of the saddle from the third cut; interception of the tool slide in the initial position.

1. Starting up

In the pressureless condition of the hydraulic copying attachment the tool slide 6 is in its lowest position, in which the right end of the auxiliary scanning lever 39 rests on the stop 37 of the saddle 5. The resetting lever 30 is in the position shown in full outline in Fig. 1, in which position it was left from the last return travel, and the lever 81 occupies the position shown in Fig. 2 and is retained by the notch 116, the intercepting cam of the cam lever 87 being directed to the right. The distributing slide valve 52 is likewise in the position shown in Fig. 2, in which position hydraulic pressure medium from the duct 56 can enter below the intercepting plunger 53.

If the pump 14 is now started up, hydraulic pressure medium at constant pressure will, as a result of the regulating action of the relieving valve 69, continuously flow through the pressure pipe 16 into the space 57 below the differential piston 13; through a pressure-reducing valve not shown in the drawing, in the port 97 of the differential piston 13, hydraulic pressure medium of variable pressure will flow into the chamber 65 above the differential piston 13. As the adjustable stylo or tracer point 100 is not at this moment resting on a pattern, the control piston 50 will be forced downwards by the spring 51, so that the control gap 85 begins to close. As a result of the rising pressure in the chamber 65, the tool slide 6 is fed inwards, and will continue to feed in until a state of equilibrium is restored in the hydraulic system by the processes hereunder described.

From the pressure pipe 16, hydraulic pressure medium flows into the pressure pipe 74 (Fig. 1), into the duct 75 and into the chamber 78, thus causing the piston 34 in the drawing to be forced to the left, so that the slide bar 36 and the parts connected thereto take up the positions shown in Fig. 1. In the control block 32 the distributing piston 31 is forced to the right by the pressure in chamber 77, against the pressure of spring 33.

As the tool slide 6 feeds in, the intercepting cam 55 encounters the face 41 of the bell-crank lever 40 (Fig. 2), thereby shifting the slide bar 36 somewhat to the right. The traveller roller 72 travels downwards along the slide bar 36, with the result that the lug 73 encounters the auxiliary scanning lever 39 and so pivots the latter and the scanning arm 68 that the control piston 50 is pushed upwards. The control gap 85 begins to open, and when a state of equilibrium has been established in the hydraulic copying system the tool slide 6 comes to a halt on its in-feed travel.

In this position of the tool slide 6 the trip block 92 of the slide bar 25 rests on the pawl 24, so that the feed of the saddle 5 is not as yet engaged because the coupling member 20 is not in engagement with either of the two gearwheels 18 and 19.

Figure 2:
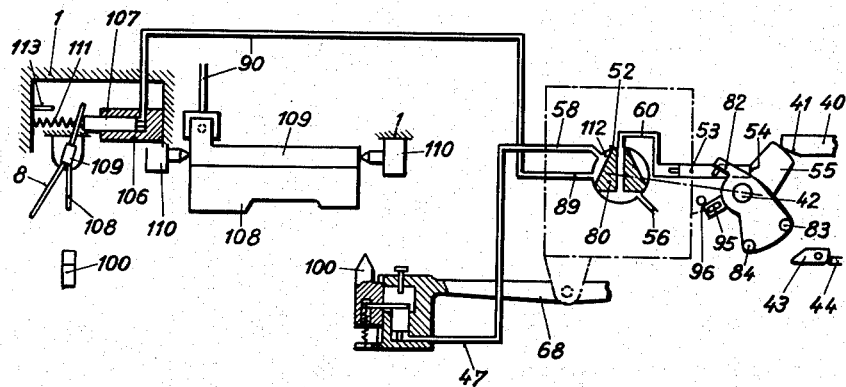
Fig. 2 is a schematic representation of the control elements, the adjustable stylo or tracer point, and the pattern-swivelling device; the tool slide is in its initial position.

From the last third cut performed, the control and locking members are still in the positions shown in Fig. 2, i. e., the attachment is in readiness for initiating a machining sequence.

2. Initiation of the machining sequence, swivelling of the pattern holder, and copying of the first cut By means of the handwheel 79, the shaft 42 with the lever 81 and the friction plate 80 is first pressed into the tool slide 6, in the direction of the arrow, against the pressure of the spring 86, so that the pins 83 and 84 of the lever 81 can, in the course of the immediately following rotation of the shaft 42, avoid the pawl 43, and then the handwheel 79 is turned in a counterclockwise direction until the stop pin 82 of the lever 81 encounters the lug 95 of the cam lever 87, whereby the intercepting plunger 53 is moved by the blocking face 54 of the cam lever 87 right to the left into the position shown in Fig. 3 and retained there by the notch 114; then the handwheel 79 is released. Through the turning of the shaft 42 the friction plate 80 of the distributing slide valve 52 has been shifted into the position shown in Fig. 3, in which position hydraulic pressure medium under constant pressure flows from the duct 56 into the duct 89, the flexible pipe 90, and the housing 106, thus causing the piston 107 to swivel the pattern holder 109, against the action of the spring 111, as far as the stop 113, where it occupies the position shown in Fig. 3. As a result, the pattern 8 is brought within range of the adjustable stylo 100.

The ducts 58 and 60 communicate through the relieving ducts 112 with the duct 62 and the return pipe 64; they are accordingly pressureless.

Figure 3:
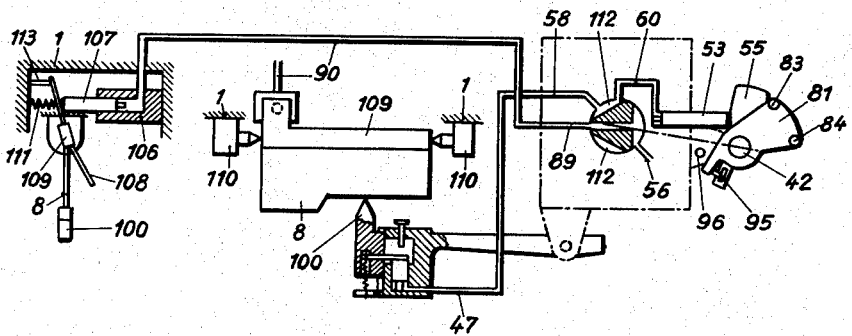
Fig. 3 shows the same members as Fig. 2 whilst the first cut is being copied.

As the intercepting cam 55 has now freed the bell-crank lever 40, the slide bar 36 moves to the left on account of the pressure in the chamber 78 of the control block 32. During this movement the lug 73 of the auxiliary lever 70 is lifted from the auxiliary scanning lever 39, so that the scanning arm 68, whose adjustable stylo 100 is not at this moment resting on a pattern, is pivoted in a clockwise direction because the spring 51 is forcing the control piston 50 downwards. As a result the control gap 85 begins to close and the tool slide 6 is fed in until the adjustable stylo 100 touches the pattern 8, when a state of equilibrium is restored to the hydraulic system; the tool slide 6 with the lathe tool 7 has in this process been fed in so far that in the copying operation that now follows the contour 101 of the pattern 8 can be produced on the workpiece 4. The adjustable trip blocks 91, 92 and 93 are so adjusted on the slide rail 25 secured to the tool slide 6 that when the lifted position of the tool slide 6 is reached the trip block 91 comes in front of the pawl 24, with the result that, through the agency of the control shaft 22 and the rod 21, the coupling member 20 comes into engagement with the gearwheel 18, thus causing a feed movement of the saddle 5 on the lathe bed 1 to take place, transmitted from a gear not shown in the drawing through the worm shaft 17, the worm 26, the wormwheel 27, the pinion 28 and the toothed rack 29. The saddle 5 is now fed forward on the lathe bed 1 whilst the adjustable stylo 100 scans the pattern 8, as shown in Fig. 3.

3. Retraction of tool slide and return travel of saddle from first cut

When the resetting lever 30 touches the left-hand trip block 11, which has been fixed to the trip shaft 10 of the lathe bed 1 according to the length of the workpiece 4 to be machined, the resetting lever 30 is pivoted to the right into the position shown in discontinuous outline in Fig. 1. In the control block 32 the distributing slide valve 31 is moved to the left and the piston 34 thereby relieved of the pressure in the chamber 78, as the hydraulic pressure medium is able to escape through the duct 75 and the annular chamber 76 into the return pipe 64. The spring 94 moves the piston 34 with the rod 35 and the slide bar 36 to the right, the auxiliary lever 70 being at the same time pivoted in a clockwise direction by the pressure of spring 71. If the lug 73 bears on the auxiliary scanning lever 39, the latter is likewise pivoted in a clockwise direction, with the result that the adjustable tracer point 100 is lifted from the pattern 8 and the control piston 50 is forced upwards against the pressure of spring 51. Owing to the enlargement of the control gap 85, the pressure in the chamber 65 declines and the tool slide 6 is retracted until the auxiliary scanning lever 39 encounters the stop 37, when a state of equilibrium is restored in the hydraulic system unless a resetting movement is previously initiated from another quarter.

During the retracting movement of the tool slide 6 the pawl 24 slides first on to the trip block 92, thereby arresting the feed movement of the saddle 5; and then the pawl 24 slides further on to the trip block 93, thus initiating the return travel of the saddle 5, as the coupling member 20 comes into engagement with the gearwheel 19. As the tool slide 6 retracts, the pin 84 of the lever 81 slides over the pawl 43, which yields in a downward direction and, under the actuation of spring 44, snaps back into the position shown in Fig. 1. When the saddle 5, on its return travel, approaches its right-hand end position, the lever 30, which is in the position shown in discontinuous outline in Fig. 1, encounters the trip block 12 and is pivoted into the position shown in continuous outline, with the result that the pressure pipes 16 and 74 are placed in communication with the chamber 78.

4. In-feed of the tool slide, swivelling of the pattern holder, and copying of the second cut By the pressure in the chamber 78, the piston 34, the rod 35 and the slide bar 36 are shifted to the left, so that, through the agency of the traveller roller 72, the lug 73 of the auxiliary lever 70 is lifted from the auxiliary scanning lever 39. The two scanning arms 39 and 68 can now move freely, as the adjustable tracer point 100 is not resting on a pattern. The control piston 50 is forced downwards by spring 51, with the result that the control gap 85 is constricted. The pressure in chamber 65 rises and the tool slide 6 is fed in, the saddle 5, however, still travelling to the right because the pawl 24 is still resting on the trip block 93.

During the in-feed movement of the tool slide 6 the pawl 24 passes from its position on the trip block 93 first on to trip block 92, so that the return travel of the saddle 5 is halted, and then on to trip block 91, which re-engages the feed movement of the saddle 5.

Figure 4:
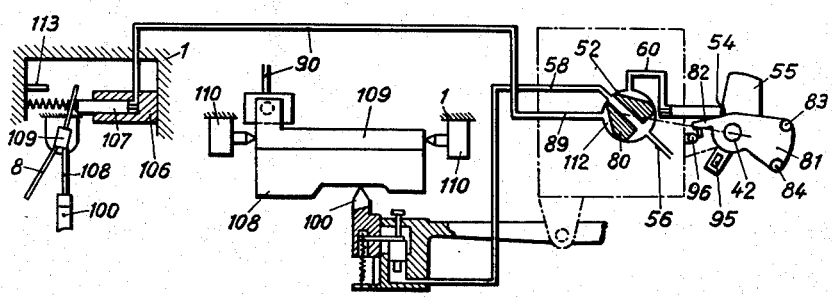
Fig. 4 shows the same members as Fig. 2 whilst the second cut is being copied.
Figure 5:
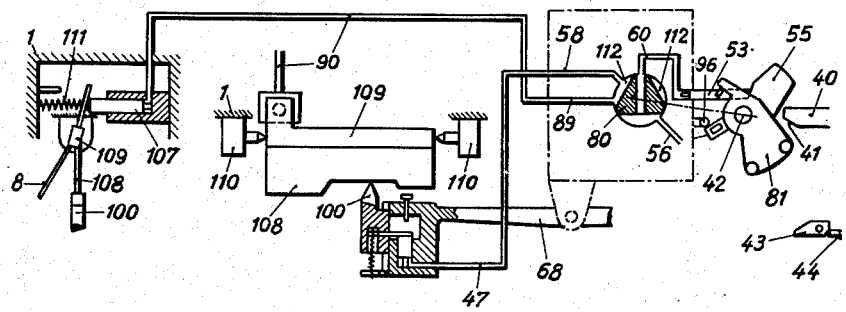
Fig. 5 shows the same elements as Fig. 2 whilst the third cut is being copied.

During the in-feed of the tool slide 6 for copying the second cut, the pin 84 of the lever 81 comes within range of the pawl 43, which does not yield in an upward direction, and the lever 81 is thereby swivelled by a certain amount in a clockwise direction into the position shown in Fig. 4, in which position the shaft 42 is retained by the notch 115. In this position of the friction plate 80 in the distributing slide valve 52 hydraulic pressure medium flows from the duct 56 into the duct 58, the flexible pipe 47, and below the adjustable piston 49 in the bore 48 of the head 9 (Fig. 6). As a result, the adjustable tracer point 100 is adjusted in relation to the head 9 by an amount that can be preset on a set screw 59, this amount corresponding to the chip thickness or cutting depth of the third chip or cut in the machining sequence.

The ducts 60 and 89 communicate with the return pipe 64 through the relieving ducts 112 and the duct 62, so that pressure no longer obtains below the piston 107 in the pattern-swivelling device. The spring 111 now swivels the pattern holder 109 into the position shown in Figs. 2, 4 and 5, in which position the pattern 108 is in range of the adjustable tracer point 100.

Since as a result of the in-feed of the tool slide 6 the pawl 24 is already resting on the trip block 93, the feed movement of the saddle 5 is initiated, and on the subsequent scanning of the pattern 108 by the adjustable stylo 100 the contour 102 of the second cut is produced on the workpiece 4 by the lathe tool 7, the various specified parts of the attachment taking up the positions schematically represented in Fig. 4.

5. Retraction of tool slide and return travel of saddle from second cut

When the saddle 5 reaches its left-hand end position, the control members are operated in the same manner as described in reference to the first cut. The tool slide 6 is retracted on the saddle 5, and the latter returns to its right-hand end position.

On the retraction of the tool slide 6 the two pins 84 and 83 slide over the pawl 43, which yields downwards and snaps back into its position as shown in Fig. 1.

When the saddle 5, on its return travel, approaches its right-hand end position, the lever 30, which is in the position indicated in discontinuous outline in Fig. 1, encounters the trip block 12 and is pivoted into the position shown in continuous outline, with the result that the pressure pipes 16 and 74 are brought into communication with the chamber 78.

6. In-feed of tool slide, retraction of adjustable tracer point, and copying of third cut The switchover from the return travel movement of the saddle 5 in its right-hand end position to the in-feed movement of the tool slide 6 is effected in the same manner as already described in the foregoing.

On the in-feed of the tool slide 6 for copying the third cut, the pin 83 comes within range of the pawl 43, which does not yield upwards, and the lever 81 is thereby pivoted through a further preset angle, in a clockwise direction, into the position shown in Fig. 5 and retained in that position by the notch 116. In this position of the friction plate 80, hydraulic pressure medium flows from the duct 56 into the duct 60 and under the intercepting plunger 53, which now bears against the blocking face 54 of the cam lever 87 and swivels the latter into the position shown in Fig. 5; this latter movement is not performed until, during the feeding-in movement of the tool slide 6, the intercepting plunger 55 has passed the face 41 of the bell-crank lever 40.

In this position of the friction plate 80, as seen in Figs. 2 and 5, the two ducts 58 and 89 are in communication through the relieving ducts 112 and the duct 62 with the return pipe 64, and as pressure no longer obtains under the adjustable piston 49, the adjustable tracer point 100 is drawn downwards by the tension spring 93 (Fig. 6) until the adjustable piston 49 is halted by the bottom of the bore 48.

Since as a result of the in-feed of the tool slide 6 the pawl 24 is already resting on the trip block 93, the feed movement of the saddle 5 is initiated and on the subsequent scanning by the adjustable tracer point 100 of the same pattern 108 as was used for the second cut, the contour 103 of the third cut is produced by the lathe tool 7 on the workpiece 4, the various specified parts of the attachment taking up the positions schematically represented in Fig. 5.

7. Retraction of tool slide and return travel of saddle from third cut; then in-feed of tool slide and interception of same in initial position When the saddle 5 reaches its left-hand end position, the control members are operated in the same manner as has been described in reference to the first and second cuts.

On the retraction of the tool slide 6 the intercepting cam 55 of the cam lever 87 slides down the bell-crank lever 40, the intercepting piston 53 being forced by a corresponding amount, by the blocking face 54, and against the pressure prevailing below said piston, into its bore. When the intercepting cam 55 has passed the bell-crank lever 40, the cam lever 87 and all the other parts specified again take up the positions shown in Fig. 5.

In the right-hand end position, owing to the automatic resetting, the in-feed movement of the tool slide 6 again commences, and when the pawl 24 is bearing on the trip block 92, i. e., with the saddle 5 at a standstill, the intercepting cam 55 encounters the face 41 of the bell-crank lever 40, with the result that the slide bar 36 is shifted to the left, parallel to itself, until the control gap 85 is sufficiently opened through the agency of the traveller roller 72, the lug 73, the auxiliary scanning lever 39, the scanning arm 68 and the control piston 50, that a state of equilibrium prevails in the hydraulic system. The tool slide 6 then halts on its in-feed travel, and as the saddle feed movement is also halted, the machine is once more in readiness for a further multiple-cut machining sequence (Fig. 2).

The multiple-cut attachment described, which is designed, or represented as having been constructed, for three successive turning operations, can be readily employed for a machining sequence of only two successive turning operations, as for instance the last two operations. It is merely necessary so to adjust the stop pin 82 on lever 81 that only half the angle remains to be tripped in order to swivel back the intercepting cam 55. When the attachment is used in this way, the handwheel 79 will, when starting up, be turned, after being pushed in, not fully to the notch 114, but only through half the angle, to notch 115, in a counterclockwise direction, so that where only one pattern 108 is used the tool slide 6 will return to its initial position (Fig. 2) after the second cut. Apart from this, the functioning of all members remains unchanged.

The use of a separate first, rough-turning pattern differing from the finished contour of the workpiece proves advantageous where, for instance, workpieces with non-uniform machining allowances are machined to the finished contours, and the use of the same pattern for the penultimate and the last turning operation affords the advantage that on copying the last cut enhanced accuracy of dimension is achieved because of the uniform chip removal. The change in the distance between the lathe tool and the point of contact of the tracer point with the pattern could, apart from using an adjustable piston in the scanning lever as described above, also be effected in accordance with our application No. 55,279 or by other means.

I claim:

1. In a lathe having a machine frame, a bed connected therewith, a saddle movable on said bed, and a plurality of patterns pivotally mounted in said frame, a hydraulic attachment for copying a plurality of scanning patterns, said attachment comprising a tool slide mounted on said saddle and displaceable transversely to the direction of movement of said saddle, means actuating said saddle, means actuating said tool slide, said tool slide having an in-feed control passage formed therein, a control piston within said control passage, a scanning arm carried by said slide and engaging said control piston, a tracer point carried by said scanning arm and having an end adapted to engage any one of said patterns to vary the positions of said scanning arm and said control piston, a lathe tool support carried by said tool slide, actuating means mounted on said bed and selectively swinging said patterns in the plane of movement of said tracer point, other actuating means carried by said scanning arm for changing the operative distance between the operative axis of the lathe and said end of the tracer point, control means connected with said two actuating means, tripping members mounted to engage said control means, and means mounted in the slide and engaging said tripping members in the course of the movement of said slide and two actuating means.

2. In a lathe capable of producing at least three successive turning operations and having a machine frame, a bed connected therewith, a saddle movable on said bed, and a plurality of patterns pivotally mounted in said frame, a hydraulic attachment for copying a plurality of scanning patterns, said attachment comprising a tool slide mounted on said saddle and displaceable transversely to the direction of movement of said saddle, means actuating said saddle, means actuating said tool slide, said tool slide having an in-feed control passage formed therein, a control piston within said control passage, a scanning arm carried by said slide and engaging said control piston, a tracer point carried by said scanning arm and having an end adapted to engage any one of said patterns to vary the positions of said scanning arm and said control piston, a lathe tool support carried by said tool slide, actuating means mounted on said bed and swinging one of said patterns in the plane of movement of said tracer point on the initiation of a first turning operation, other actuating means carried by said scanning arm for changing the operative distance between the operative axis of the lathe and said end of the tracer point before a second turning operation, control means connected with said two actuating means, tripping members mounted to engage said control means, means mounted in the slide and engaging said tripping members in the course of the movement of said slide to operate said two actuating means, means mounted in the slide and operable before a third turning operation and actuating the first-mentioned actuating means to restore the initial operative distance between the operative axis of the lathe and said end of the tracer point, and means mounted on said saddle for returning said tool slide to its starting position.

3. In a lathe capable of producing at least three successive turning operations and having a machine frame, a bed connected therewith, a saddle movable on said bed, and a plurality of patterns pivotally mounted in said frame, a hydraulic attachment for copying a plurality of scanning patterns, said attachment comprising a tool slide mounted on said saddle and displaceable transversely to the direction of movement of said saddle, means actuating said saddle, means actuating said tool slide, said tool slide having an in-feed control passage formed therein, a control piston within said control passage, a scanning arm carried by said slide and engaging said control piston, a tracer point carried by said scanning arm and having an end adapted to engage any one of said patterns to vary the positions of said scanning arm and said control piston, a lathe tool support carried by said tool slide, actuating means mounted on said bed and swinging one of said patterns in the plane of movement of said tracer point on the initiation of a first turning operation, other actuating means carried by said scanning arm for changing the operative distance between the operative axis of the lathe and said end of the tracer point before a second turning operation, control means connected with said two actuating means, tripping members mounted to engage said control means, means mounted in the slide and engaging said tripping members in the course of the movement of said slide to operate said two actuating means, means mounted in the slide and operable before a third turning operation and actuating the first-mentioned actuating means to restore the initial operative distance between the operative axis of the lathe and said end of the tracer point, and tripping members on said saddle for intercepting said tool slide on completion of the third turning operation.

4. In a lathe capable of producing at least three successive turning operations and having a machine frame, a bed connected therewith, a saddle movable on said bed, and a plurality of patterns pivotally mounted in said frame, a hydraulic attachment for copying a plurality of scanning patterns, said attachment comprising a tool slide mounted on said saddle and displaceable transversely to the direction of movement of said saddle, means actuating said saddle, means actuating said tool slide, said tool slide having an in-feed control passage formed therein, a control piston within said control passage, a scanning arm carried by said slide and engaging said control piston, a tracer point carried by said scanning arm and having an end adapted to engage any one of said patterns to vary the positions to said scanning arm and said control piston, a lathe tool support carried by said tool slide, actuating means mounted on said bed and swinging one of said patterns in the plane of movement of said tracer point on the initiation of a first turning operation, other actuating means carried by said scanning arm for changing the operative distance between the operative axis of the lathe and said end of the tracer point before a second turning operation, control means connected with said actuating means, tripping members mounted to engage said control means, means mounted in the slide and engaging said tripping members in the course of the movement of said slide to operate said two actuating means, means mounted in the slide and operable before a third turning operation and actuating the first-mentioned actuating means to restore the initial operative distance between the operative axis of the lathe and said end of the tracer point, resetting members on the lathe bed, a system of rods located on the saddle and connected with said resetting members, an auxiliary scanning lever connected with said scanning arm and said rods, an auxiliary lever connected with said auxiliary scanning lever, and a spring engaging said auxiliary lever.

5. In a lathe capable of producing at least three successive turning operations and having a machine frame, a bed connected therewith, a saddle movable on said bed, and a plurality of patterns pivotally mounted in said frame, a hydraulic attachment for copying a plurality of scanning patterns, said attachment comprising a tool slide mounted on said saddle and displaceable transversely to the direction of movement of said saddle, means actuating said saddle, means actuating said tool slide, said tool slide having an in-feed control passage formed therein, a control piston within said control passage, a scanning arm carried by said slide and engaging said control piston, a tracer point carried by said scanning arm and having an end adapted to engage any one of said patterns to vary the positions of said scanning arm and said control piston, a lathe tool support carried by said tool slide, actuating means mounted on said bed and swinging one of said patterns in the plane of movement of said tracer point in the initiation of a first turning operation, other actuating means carried by said scanning arm for changing the operative distance between the operative axis of the lathe and said end of the tracer point before a second turning operation, control means connected with said actuating means, tripping members mounted to engage said control means, means mounted in the slide and engaging said tripping members in the course of the movement of said slide to operate said two actuating means, means mounted in the slide and operable before a third turning operation and actuating the first-mentioned actuating means to restore the initial operative distance between the operative axis of the lathe and said end of the tracer point, control members actuated by the tool slide in its in-feed movements, and means operated by said control members for automatically initiating and halting the feed and return movements of the saddle.

6. In a lathe capable of producing at least three successive turning operations and having a machine frame, a bed connected therewith, a saddle movable on said bed, and a plurality of patterns pivotally mounted in said frame, a hydraulic attachment for copying a plurality of scanning patterns, said attachment comprising a tool slide mounted on said saddle and displaceable transversely to the direction of movement of said saddle, means actuating said saddle, means actuating said tool slide, said tool slide having an in-feed control passage formed therein, a control piston within said control passage, a scanning arm carried by said slide and engaging said control piston, an adjustable tracer point movably mounted in said scanning arm, a spring engaging said tracer point, said tracer point having an end adapted to engage any one of said patterns to vary the positions of said scanning arm and said control piston, a lathe tool support carried by said tool slide, actuating means mounted on said bed and swinging one of said patterns in the plane of movement of said tracer point on the initiation of a first turning operation, other actuating means carried by said scanning arm and comprising control and tripping members changing the operative distance between the operative axis of the lathe and said end of the tracer point before a second turning operation, control means connected with said two actuating means, tripping members mounted to engage said control means, means mounted in the slide and engaging said tripping members in the course of the movement of said saddle to operate said two actuating means, and means operable before a third turning operation and operating the first-mentioned actuating means to restore the initial operative distance between the operative axis of the lathe and said end of the tracer point.

7. In a lathe capable of producing at least three successive turning operations and having a machine frame, a bed connected therewith, a saddle movable on said bed, and a plurality of patterns pivotally mounted in said frame, a hydraulic attachment for copying a plurality of scanning patterns, said attachment comprising a tool slide mounted on said saddle and displaceable transversely to the direction of movement of said saddle, means actuating said saddle, means actuating said tool slide, said tool slide having an in-feed control passage formed therein, a control piston within said control passage, a scanning arm carried by said slide and engaging said control piston, a tracer point carried by said scanning arm and having an end adapted to engage any one of said patterns to vary the positions of said scanning arm and said control piston, a lathe tool support carried by said tool slide, actuating means mounted on said bed and swinging one of said patterns in the plane of movement of said tracer point on the initiation of a first turning operation, other actuating means carried by said scanning arm for changing the operative distance between the operative axis of the lathe and said end of the tracer point before a second turning operation, control means connected with said two actuating means, tripping members mounted to engage said control means, means mounted in the slide and engaging said tripping members in the course of the movement of said slide to operate said two actuating means, means mounted in the slide and operable before a third turning operation and actuating the first-mentioned actuating means to restore the initial operative distance between the operative axis of the lathe and said end of the tracer point, a locking member movable along with said slide, a resetting member, and means actuating said locking member on completion of the second turning operation to move it to an intercepting position.

8. In a lathe capable of producing at least three successive turning operations and having a machine frame, a bed connected therewith, a saddle movable on said bed, and a plurality of patterns pivotally mounted in said frame, a hydraulic attachment for copying a plurality of scanning patterns, said attachment comprising a tool slide mounted on said saddle and displaceable transversely to the direction of movement of said saddle, means actuating said saddle, means actuating said tool slide, said tool slide having an in-feed control passage formed therein, a control piston within said control passage, a scanning arm carried by said slide and engaging said control piston, a tracer point carried by said scanning arm and having an end adapted to engage any one of said patterns to vary the positions of said scanning arm and said control piston, a lathe tool support carried by said tool slide, a pattern-swivelling device, control and tripping members operating said pattern-swivelling device, resilient means subjecting said pattern-swivelling device to unilateral spring pressure, said pattern-swivelling device swinging one of said patterns in the plane of movement of said tracer point on the initiation of the first turning operation, actuating means carried by said scanning arm for changing the operative distance between said lathe tool support and said end of the tracer point before a second turning operation, means engaging said tripping members in the course of the movement of said saddle to operate said pattern-swivelling device and said actuating means, and means mounted in the slide and operable before a third turning operation and actuating the first-mentioned actuating means to restore the initial operative distance between the operative axis of the lathe and said end of the tracer point.

9. In a lathe capable of producing at least three successive turning operations and having a machine frame, a bed connected therewith, a saddle movable on said bed, and a plurality of patterns pivotally mounted in said frame, a hydraulic attachment for copying a plurality of scanning patterns, said attachment comprising a tool slide mounted on said saddle and displaceable transversely to the direction of movement of said saddle, means actuating said saddle, means actuating said tool slide, said tool slide having an in-feed control passage formed therein, a control piston within said control passage, a scanning arm carried by said slide and engaging said control piston, a tracer point carried by said scanning arm and having an end adapted to engage any one of said patterns to vary the positions of said scanning arm and said control piston, a lathe tool support carried by said tool slide, actuating means mounted on said bed and swinging one of said patterns in the plane of movement of said tracer point on the initiation of a first turning operation, other actuating means carried by said scanning arm for changing the operative distance between the operative axis of the lathe and said end of the tracer point before a second turning operation, control means connected with said two actuating means, tripping members mounted to engage said control means, means mounted in the side and engaging said tripping members in the course of the movement of said slide to operate the first-mentioned actuating means, hydraulic means operating the second-mentioned actuating means, and means operable before a third turning operation and actuating the first-mentioned actuating means to restore the initial operative distance between said lathe tool support and said end of the tracer point.

10. In a lathe capable of producing at least three successive turning operations and having a machine frame, a bed connected therewith, a saddle movable on said bed, and a plurality of patterns pivotally mounted in said frame, a hydraulic attachment for copying a plurality of scanning patterns, said attachment comprising a tool slide mounted on said saddle and displaceable transversely to the direction of movement of said saddle, means actuating said saddle, means actuating said tool slide, said tool slide having an in-feed control passage formed therein, a control piston within said control passage, a scanning arm carried by said slide and engaging said control piston, a tracer point carried by said scanning arm and having an end adapted to engage any one of said patterns to vary the positions of said scanning arm and said control piston, a lathe tool support carried by said tool slide, a pattern-swivelling device, control and tripping members operating said pattern-swivelling device, hydraulic means actuating said members, resilient means subjecting said pattern-swivelling device to unilateral spring presser, said pattern-swivelling device swinging one of said patterns in the plane of movement of said tracer point on the initiation of the first turning operation, actuating means carried by said scanning arm for changing the operative distance between the operative axis of the lathe and said end of the tracer point before a second turning operation, and means operable before a third turning operation and actuating the first-mentioned actuating means to restore the initial operative distance between the operative axis of the lathe and said end of the tracer point.

11. In a lathe capable of producing at least three successive turning operations and having a machine frame, a bed connected therewith, a saddle movable on said bed, and a plurality of patterns pivotally mounted in said frame, a hydraulic attachment for copying a plurality of scanning patterns, said attachment comprising a tool slide mounted on said saddle and displaceable transversely to the direction of movement of said saddle, means actuating said saddle, means actuating said tool slide, said tool slide having an in-feed control passage formed therein, a control piston within said control passage, a scanning arm carried by said slide and engaging said control piston, a tracer point carried by said scanning arm and having an end adapted to engage any one of said patterns to vary the positions of said scanning arm and said control piston, a lathe tool support carried by said tool slide, actuating means mounted on said bed and swinging one of said patterns in the plane of movement of said tracer point on the initiation of a first turning operation, other actuating means carried by said scanning arm for changing the operative distance between said lathe tool support and said end of the tracer point before a second turning operation, control means connected with said two actuating means, tripping members connected with said control means, means engaging said tripping members in the course of the movement of said saddle to operate said two actuating means, means operable before a third turning operation and actuating the first-mentioned actuating means to restore the initial operative distance between the operative axis of the lathe and said end of the tracer point, a continuous-flow control system, a differential piston in said system, and means operatively connecting said tracer point with said piston for regulating the in-feed movement of the tool slide.

References Cited in the file of this patent

UNITED STATES PATENTS

| Number | Name | Date |
|---|---|---|
| 571,901 | Heald | Nov. 24, 1896 |
| 2,133,191 | Danner | Oct. 11, 1938 |
| 2,433,048 | Himoff | Dec. 23, 1947 |
| 2,437,570 | Von Zelewsky | Mar. 9, 1948 |
| 2,456,158 | Tancred | Dec. 14, 1948 |
| 2,540,323 | Cross | Feb. 6, 1951 |

FOREIGN PATENTS

| Number | Country | Date |
|---|---|---|
| 597,017 | Great Britain | Jan. 15, 1948 |